United States Patent
Brehob et al.

(10) Patent No.: US 7,165,529 B2
(45) Date of Patent: Jan. 23, 2007

(54) METHOD TO CONTROL ELECTROMECHANICAL VALVES IN A DISI ENGINE

(75) Inventors: Diana D. Brehob, Dearborn, MI (US); Julia H. Buckland, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/002,640

(22) Filed: Dec. 2, 2004

(65) Prior Publication Data

US 2006/0118080 A1    Jun. 8, 2006

(51) Int. Cl.
*F02B 5/00* (2006.01)
*F02B 5/02* (2006.01)

(52) U.S. Cl. ................... 123/305; 123/90.15
(58) Field of Classification Search ........... 123/90.11, 123/90.15, 305; 335/266, 268, 256
See application file for complete search history.

(56) References Cited

U.S. PATENT DOCUMENTS

| | | | | |
|---|---|---|---|---|
| 5,636,601 A * | 6/1997 | Moriya et al. | ........... | 123/90.11 |
| 5,868,108 A * | 2/1999 | Schmitz et al. | ........... | 123/90.11 |
| 6,073,596 A * | 6/2000 | Kemper | ........... | 123/90.11 |
| 6,170,445 B1 * | 1/2001 | Hattori et al. | ........... | 123/90.11 |
| 6,182,621 B1 * | 2/2001 | Salber et al. | ........... | 123/90.15 |
| 6,247,432 B1 * | 6/2001 | Pischinger et al. | ........... | 123/90.11 |
| 6,333,843 B2 * | 12/2001 | Boie et al. | ........... | 361/140 |
| 6,405,693 B2 * | 6/2002 | Yoeda et al. | ........... | 123/90.15 |
| 6,427,651 B1 * | 8/2002 | Kemper et al. | ........... | 123/90.11 |
| 6,557,505 B1 * | 5/2003 | Hori | ........... | 123/90.11 |
| 6,572,074 B2 * | 6/2003 | Yang et al. | ........... | 251/54 |
| 6,619,245 B1 * | 9/2003 | Fujiwara et al. | ........... | 123/90.11 |
| 6,675,751 B1 * | 1/2004 | Megli et al. | ........... | 123/90.12 |
| 6,681,728 B2 * | 1/2004 | Haghgooie et al. | ........... | 123/90.11 |
| 6,681,730 B1 * | 1/2004 | Koneda et al. | ........... | 123/90.11 |
| 6,701,887 B2 * | 3/2004 | Salber et al. | ........... | 123/315 |
| 6,805,079 B1 * | 10/2004 | Brehob et al. | ........... | 123/90.11 |

OTHER PUBLICATIONS

SAE 2003-01-0033; "Optimization Techniques and Results for the Operating Modes of a Camless Engine"; Trask et al., Detroit, MI, Mar. 3-6, 2003.
SAE 2000-01-1223; "Benefits of the Electromechanical Valve Train In Vehicle Operation"; Pischinger et al.; Detroit, MI, Mar. 6-9, 2000.

* cited by examiner

*Primary Examiner*—Mahmoud Gimie
(74) *Attorney, Agent, or Firm*—Diana D. Brehob

(57) ABSTRACT

A system and method are disclosed for operating an internal combustion engine in which the intake valves are electromechanical valves and the engine has direct fuel injection. By opening the intake valves during the intake stroke when the piston is moving at its maximum speed, the turbulence through the intake valve is enhanced, thereby increasing combustion speed, and hence combustion stability at low torque, low speed operating conditions. Furthermore, if the fuel injection interval occurs when flow of gases through the intake is highest, air-fuel mixing is improved.

19 Claims, 4 Drawing Sheets

METHOD TO CONTROL ELECTROMECHANICAL VALVES IN A DISI ENGINE

FIELD OF THE INVENTION

The present invention relates generally to a method for controlling electromechanical valves in an internal combustion engine with direct fuel injection.

BACKGROUND OF THE INVENTION

An electromechanically operated poppet valve in the cylinder head of an internal combustion, as disclosed in U.S. Pat. No. 4,455,543, is actuated by energizing and de-energizing electromagnets acting upon an armature coupled to the poppet valve. Because the actuation of the electromagnets is controlled by an electronic control unit, valve opening and closing events occur independently of engine rotation. In conventional engines with camshaft actuated valves, which have timings based on engine rotation, air delivery to the cylinders is controlled by a throttle valve placed in the inlet duct of the engine. In contrast, electromechanical valves are capable of controlling air delivery based on valve timing, thereby providing a thermal efficiency improvement over throttled operation of a conventional engine.

However, a drawback to electromechanical valves, particularly at low torque, is the undesirable noise generated when the valves impact upon opening and closing. Furthermore, because there is no throttling, or less throttling, the incoming air through the valves has very little turbulence. The ensuing combustion wave propagates very slowly through the relatively quiescent mixture, leading to combustion instability and rough operation. Furthermore, fuel-air mixing, particularly in engines with direct fuel injection, is insufficient at low turbulence levels.

SUMMARY OF THE INVENTION

Disadvantages of prior methods are overcome by a method for operating an internal combustion engine, the engine having a plurality of engine cylinders with reciprocating pistons. Each cylinder has an electromechanically-actuated intake valve, an exhaust valve, and a fuel injector disposed in a cylinder head of the engine. The engine also has an electromechanical valve system with: an armature connected to the intake valve, a valve closing electromagnet capable of exhibiting an electromagnetic force for attracting the armature to open the intake valve, a valve opening spring for biasing the armature in a direction to open the intake valve, and a valve closing spring for biasing the armature in a direction to close the intake valve. The method includes de-energizing the valve closing electromagnet associated with a particular cylinder during an intake stroke such that the intake valve is fully open when a speed of the piston within the particular cylinder is near a maximum; opening the fuel injector so that fuel sprays into the particular cylinder during peak flow rate through the intake valve; and energizing the valve closing electromagnet after a predetermined time has elapsed.

Also disclosed is an internal combustion engine with a plurality of cylinders. The engine has an electromagnetically-actuated intake valve disposed in each cylinder, a piston in each cylinder, an armature operatively connected to said intake valve, a valve closing electromagnet capable of exhibiting an electromagnetic force for attracting the armature to close the intake valve, a valve opening spring coupled to the armature for biasing the armature in a direction to open the intake valve, and a valve closing spring coupled to the armature for biasing the intake valve to a closed position. The engine is coupled to an electronic control until which is further coupled to the valve closing electromagnet. The electronic control unit de-energizes the valve closing electromagnet in a particular cylinder during an intake stroke in the particular cylinder. The electronic control unit energizes the valve closing electromagnet. The time of de-energizing is such that the intake valve is fully open near a time of a maximum speed of the piston in the particular cylinder.

An advantage of the present invention is that the valve is opened at such a time in the intake stroke to provide a high degree of turbulence to the intake gases in the cylinder. The higher turbulence increases the combustion rate

BRIEF DESCRIPTION OF THE DRAWINGS

The advantages described herein will be more fully understood by reading an example of an embodiment in which the invention is used to advantage, referred to herein as the Detailed Description, with reference to the drawings wherein.

DETAILED DESCRIPTION OF THE PREFERRED EMBODIMENTS

Figure 1:
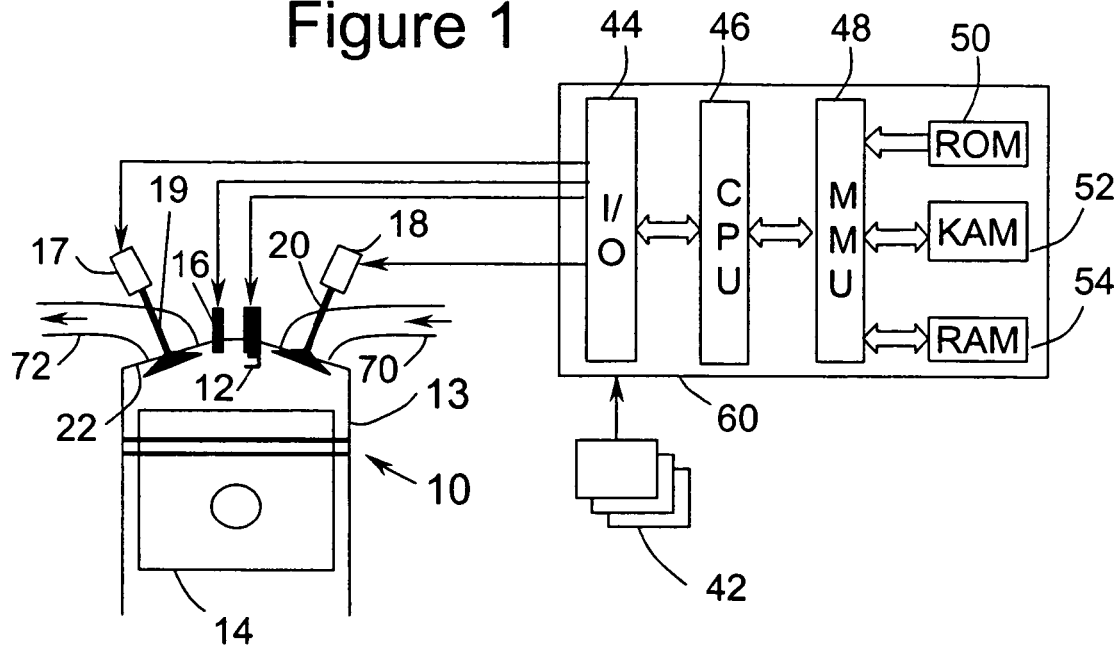
FIG. 1 is a schematic of an engine equipped with electromechanically-actuated poppet valves.

In FIG. 1, a single cylinder 13 of an internal combustion engine 10 with an electromechanical intake valve 20 and exhaust valve 19 is shown. Engine 10 contains a piston 14 which reciprocates within cylinder 13. Intake valve 20, disposed in cylinder head 22, is opened to allow gases to communicate between the combustion chamber (the volume enclosed by cylinder 13, piston 14, and cylinder head 22) and intake port 70. When exhaust valve 19 is opened, gases are released from the combustion chamber into exhaust port 72. In the embodiment shown in FIG. 1, fuel is injected into the combustion chamber by injector 16, a configuration commonly called direct fuel injection. Intake valve 20 and exhaust valve 19 are actuated electromechanically by valve actuators 18 and 17, respectively. In a preferred embodiment, engine 10 is a spark-ignited engine, spark plug 12 initiates combustion in the combustion chamber. The present invention also applies to engines with other types of igniters and to compression ignition engines in which the fuel and air spontaneously ignite due to a compression-generated temperature rise in the combustion chamber. Both diesel and homogeneous charge compression ignition are examples of the latter type of engine.

Continuing to refer to FIG. 1, electronic control unit (ECU) 60 is provided to control engine 10. ECU 60 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 50, random-access memory (RAM) 54, and keep-alive memory (KAM) 52, for example. KAM 52 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which the engine is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are fuel injection timing, fuel injection rate, fuel injection duration, throttle valve position, spark plug 12 timing, actuation of valve actuators 18 and 17 to control opening and closing of intake valve 20 and exhaust valve 19, respectively, and others. Sensors 42 communicating input through I/O interface 44 may be indicating piston position, engine rotational speed, vehicle speed, coolant temperature, intake manifold pressure, pedal position, throttle valve position, air temperature, exhaust temperature, exhaust stoichiometry, exhaust component concentration, and air flow. Some ECU 60 architectures do not contain MMU 48. If no MMU 48 is employed, CPU 46 manages data and connects directly to ROM 50, RAM 54, and KAM 52. Of course, the present invention could utilize more than one CPU 46 to provide engine control and ECU 60 may contain multiple ROM 50, RAM 54, and KAM 52 coupled to MMU 48 or CPU 46 depending upon the particular application.

Figure 2:
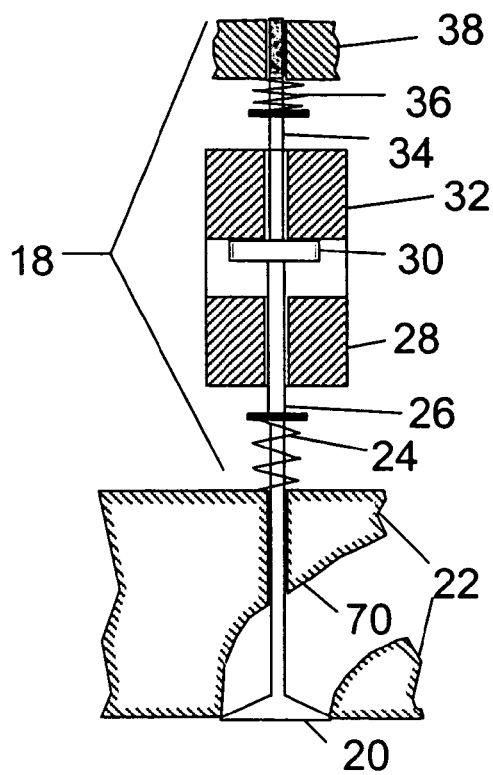
FIG. 2 is a detail of an example of an electromechanically-actuated poppet valve in a closed position.

In FIG. 2, an example of an electromechanical valve actuator 18 is shown in which intake valve 20 is in a closed position. Intake valve 20 closes off port 70 in cylinder head 22. Valve actuator 18 is shown in detail in FIG. 2. A valve closing spring 24 biases valve 20 to the closed position. Armature 30 is disposed between two electromagnets: a valve closing electromagnet 32 and valve opening electromagnet 28. Armature 30 is connected to shafts 26 and 34. As shown in FIG. 2, armature 30 is next to valve closing electromagnet 32. For this position to prevail, valve-closing electromagnet 32 is energized. Otherwise, armature 30 would act under the influence of valve closing spring 24 and valve opening spring 36. In the embodiment shown in FIG. 2, valve opening spring is attached to shaft 34 at the lower end of valve opening spring 36. Other alternative configurations may also provide the same functionality, e.g., an electrohydraulic system. If both electromagnets 28 and 32 are de-energized, armature 30 is influenced by springs 24 and 36 and attains a neutral position in between electromagnets 28 and 34. Valve actuator 17 and exhaust valve 19 can also be represented by FIG. 2, by way of example.

Continuing to refer to FIG. 2, valve actuator 18 preferably includes a valve position-sensing device, such as a linear variable differential transformer (LVDT) 38. The tip of shaft 34 forms the core of the position sensor. The inductance of the LVDT varies when the position of the shaft 34 is altered with respect to the LVDT 38 windings. LVDT 38 is connected to ECU 60 (connection not shown). LVDT 38 is shown by way of example; other types of position sensing devices may also be used.

Figure 3:
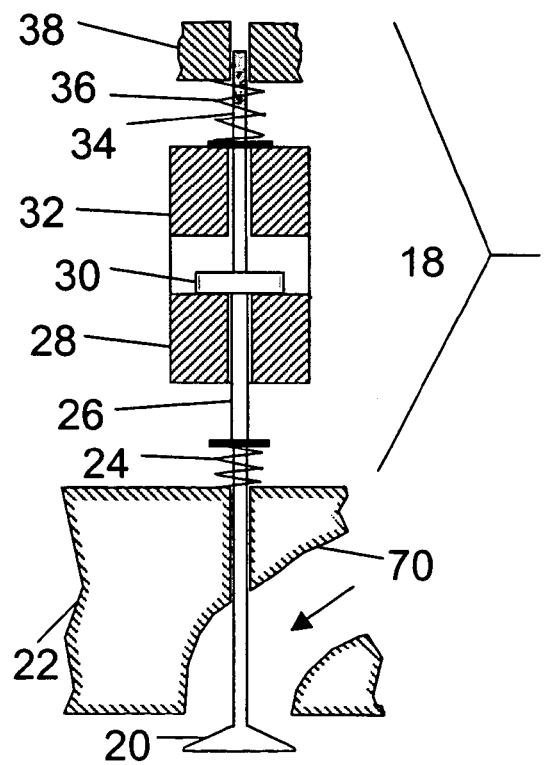
FIG. 3 is a detail of an example of an electromechanically-actuated poppet valve in an open position.

FIG. 3 shows the same hardware as shown in FIG. 2 with the difference being that FIG. 2 shows valve 20 in the fully closed position and FIG. 3 shows valve 20 in the fully open position. Thus, in FIG. 2, valve closing electromagnet 32 is energized and, in FIG. 3, valve opening electromagnet 28 is energized. In FIG. 2, valve opening spring 36 is compressed. Holding current is applied to valve closing electromagnet 32 to act against the spring tension of valve opening spring 36. Analogously, in FIG. 3, valve closing spring 24 is compressed. Holding current is applied to valve opening electromagnet 28 to act against the spring tension of valve closing spring 24.

Before discussing aspects of the present invention, an example of prior art control of an electromechanical valve is described. Typically, a valve, whether an intake or exhaust valve, of an internal combustion engine is normally closed, i.e., the valve is in the closed position for more of the time than the open position. Thus, the description of valve opening begins with a closed valve, i.e., with a holding current be applied to valve closing electromagnet 32. Actuating the valve proceeds by: de-energizing valve closing electromagnet 32 which causes the valve to open under the influence of valve opening spring 36; applying a peak current to valve opening electromagnet 28 to grab armature 30 when it is near its fully open position; applying a holding current to valve opening electromagnet 28 after armature 30 is attracted to valve opening electromagnet 28); applying holding current for as long as the desired open duration of the valve; de-energizing valve opening electromagnet 28 which causes the valve to close under the influence of valve closing spring 24; and, applying a peak current to valve opening electromagnet 32 to grab armature 30 when it is near its fully closed position. The terms peak current and holding current are concepts known to those skilled in the art and refer to a higher current level (peak current) used to catch a moving armature 30 and a lesser current (holding current) used to prevent a stationary armature 30 from moving.

The neutral position, i.e., the position that valve 20 attains when both electromagnets 28 and 34 are de-energized, is about halfway between the fully closed position, FIG. 2, and fully open position, FIG. 3. The exact neutral position would depend, though, on the relative spring tensions of valve opening spring 36 and valve closing spring 24.

Figure 4A:
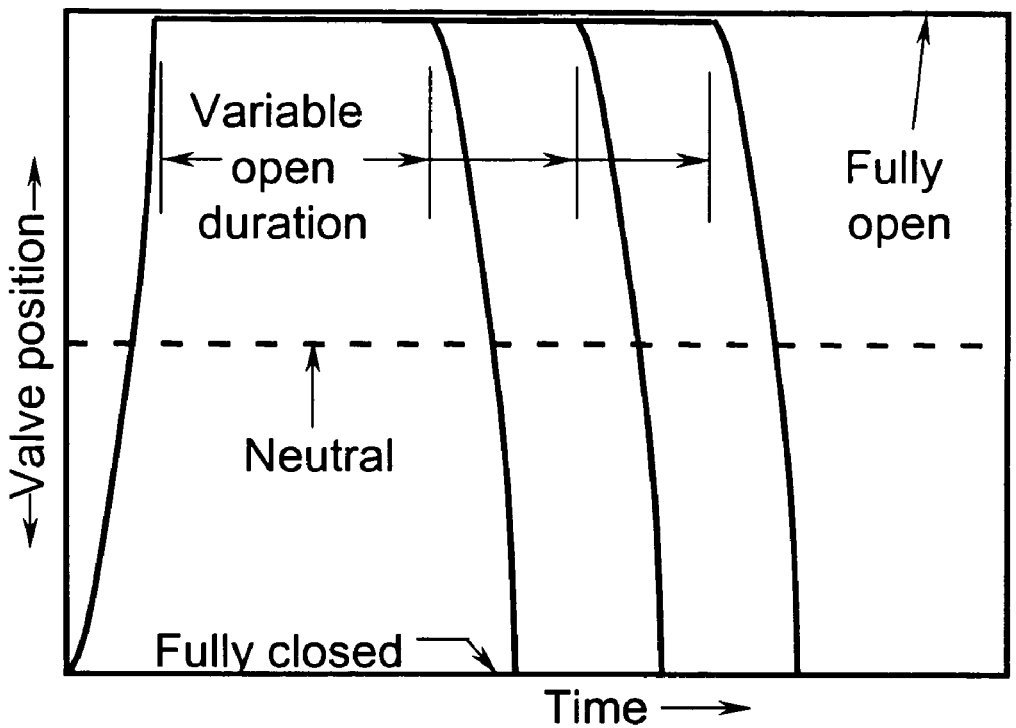
FIG. 4a is a graph of valve position for an electromechanically actuated poppet valve operated using both the valve closing electromagnet and the valve opening electromagnet.

The valve lift profiles for normal valve operation are shown in FIG. 4a. The valve opens and is held open for a variable duration and then the valve is closed. Three example durations are shown in FIG. 4a. The minimum duration is the sum of the opening time and the closing time and the maximum duration is infinite.

Figure 4B:
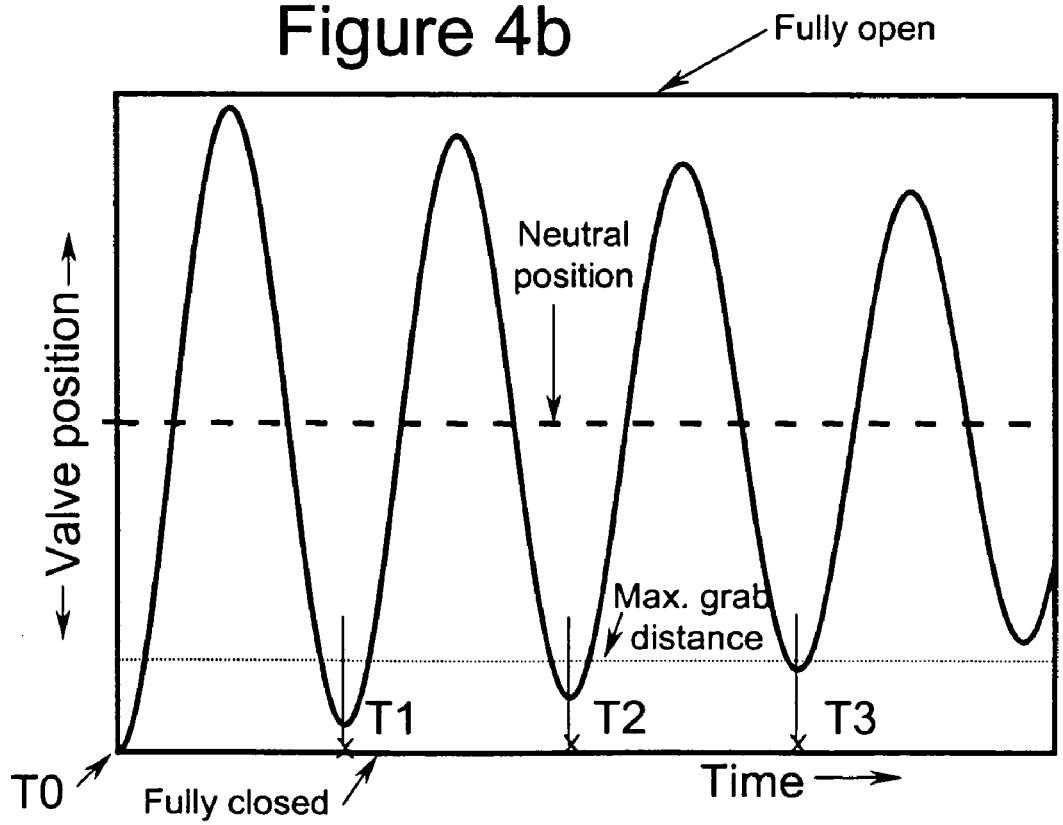
FIG. 4b is a graph of valve position for an electromechanically actuated poppet valve operated using only the valve closing electromagnet.

In FIG. 4b, a plot of valve position as a function of time is shown for valve 20 under the situation that the valve at time T0 is at the fully closed position by virtue of holding current being applied to valve closing electromagnet 32. At time T0+, valve closing electromagnet 32 is de-energized. The valve lifts from the fully closed position and proceeds to a nearly open position by action of the valve opening spring 36. As valve 20 progresses to a nearly open position, valve closing spring 24 becomes compressed. Valve 20 then returns to a nearly closed position under the influence of the valve closing spring 24. The period of time that it takes for the valve to leave the fully closed position, travel to a nearly open position, and return to a nearly closed position is called a valve period and is indicated as T1 in FIG. 4b. The oscillation of valve 20 continues, with each successive peak and trough being closer to the neutral position than the prior peak or trough, due to irreversibilities in the system. Eventually, valve 20 stops oscillating and attains the neutral position (not shown in FIG. 4). Period T2 is twice period T1 and period T3 is three times period T1, etc. The first three troughs of the curve in FIG. 4b are lower than the maximum grabbing distance dotted line with the $4^{th}$ trough being above the maximum grabbing distance. The maximum grabbing distance is the maximum distance away from the fully closed position that armature 30 may be and still allow valve closing electromagnet 32 to attract armature 30. If armature 30 is farther away from the fully closed position than the maximum grabbing distance, valve closing electromagnet 32 cannot attract armature 30, that is, at the peak current of the driving system (not shown). For the example shown in FIG. 4b, after de-energizing valve closing electromagnet 32, armature 30 may be allowed to oscillate three periods and still allow valve closing electromagnet 32 to catch armature 30 at around the end of period T3. If valve closing electromagnet 32 were not caught before valve 20 begins the fourth oscillation, valve 20 would not come to a position where valve closing electromagnet 32 could exert enough attractive force to catch valve 20. The discrete times at which the valve can be grabbed are designated with an X on the abscissa of FIG. 4b.

Figure 5A:
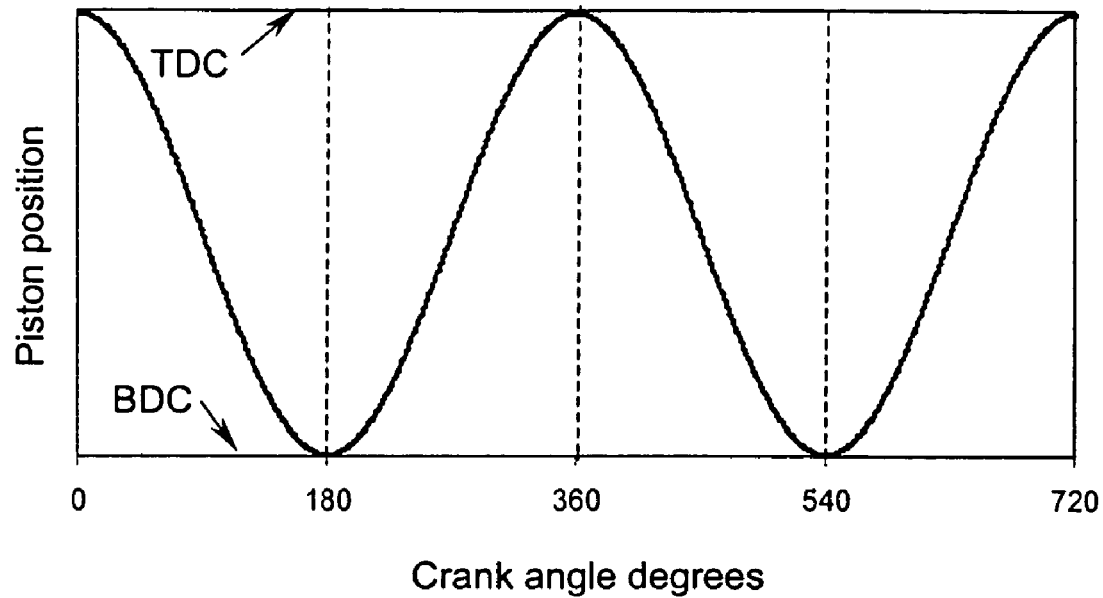
FIG. 5a is a graph of piston position as a function of crank angle degree.
Figure 5B:
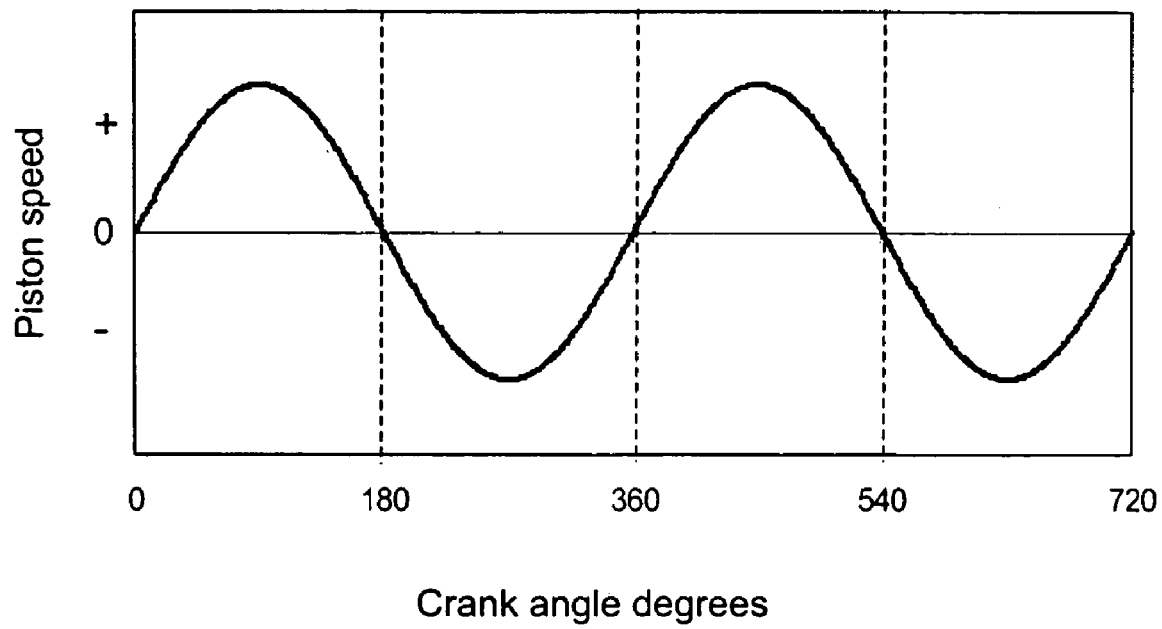
FIG. 5b is a graph of piston speed as a function of crank angle degree.

Referring now to FIG. 5a, piston position as a function of crank angle degree is shown. FIG. 5b shows piston speed as a result of the change in piston position. As the piston travels from top dead center (TDC) to bottom dead center (BDC) accomplished during the 0–180 crank degrees of crank rotation, the piston speed is a 0 speed at 0 degrees, at a maximum at approximately 90 crank degrees, and returns to 0 speed at about 180 degrees. Peak piston speed occurs during the middle of the intake stroke. Because flow through the valve is influenced by the vacuum generated in the combustion chamber which is induced by the piston movement, peak flow through the valve is related to the maximum piston speed.

In both FIGS. 5a and 5b, purely sinusoidal piston movement and speed are shown. The actual piston move and piston movement deviate slightly from a sinusoid, actual movement being a function of crank throw and stroke length. FIGS. 5a and 5b are approximations to true piston movement.

It is well known to those skilled in the art, that combustion stability is poor at low torque engine conditions, partially due to low turbulence levels in the combustion chamber. Turbulence is enhanced when the speed of gases flowing through the intake valve is increased. By timing the opening of intake valve 20 such that piston 14 is near its maximum speed increases the flow velocity through intake valve 20. With a direct fuel injected engine, such as shown in FIG. 1, fuel air mixing is enhanced when fuel injection occurs concurrent with maximum flow through intake valve 20. Intake flow blows by the injector shearing the fuel jet and causing the air to entrain fuel droplets.

Figure 6:
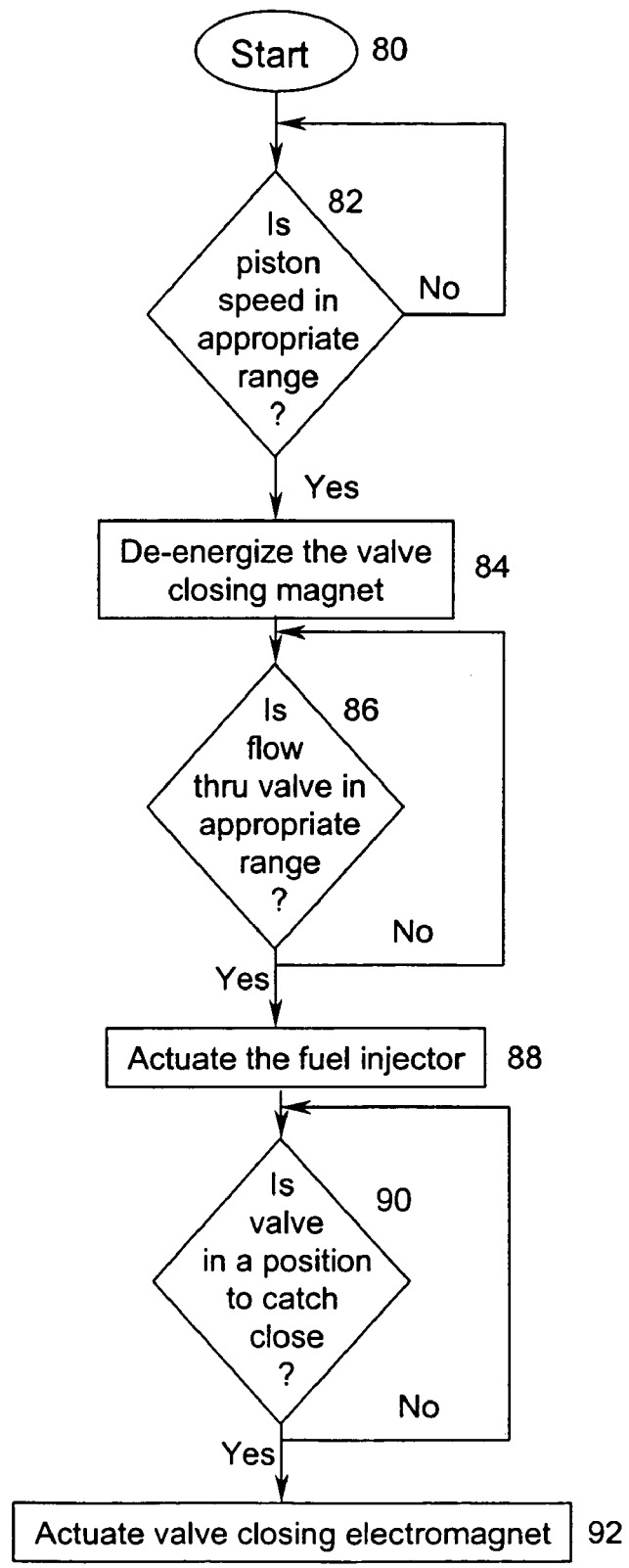
FIG. 6 is a flowchart showing a method of operating the intake valve and fuel injector according to an aspect of the present invention.

Referring to FIG. 6, a method by which the present invention can be used to advantage is illustrated with a flow chart. The algorithm starts in block 80. Control passes to block 82 in which it is determined if piston speed is in an appropriate range, meaning whether the piston is moving sufficiently fast to cause a high intake flow when intake valve is opened. If not, wait until a positive result in block 82, from which control passes to block 84. The valve closing magnet is de-energized allowing intake valve 20 to open. Control passes to block 86 in which it is determined whether the flow of gases through intake valve 20 is appropriate for beginning fuel injection. If a negative result in block 86, wait until a positive result, from which control passes to block 88. In block 88 the fuel injector is actuated. Control then passes to block 90 in which it is determined whether intake valve 20 is in an appropriate range to catch intake valve 20. If so, control passes to block 92 in which the valve closing electromagnet is actuated to close intake valve 20.

In an alternative embodiment, decision blocks 82, 86, and 90 of FIG. 6 are supplanted by a model of valve dynamics, flow through the intake valve, piston speed, etc. That is, a model is used to determine at what crank angle the piston speed is appropriate, based on current operating conditions, to send out a signal to de-energize the valve closing electromagnet, and similarly for blocks 86 and 90. In an alternative embodiment, lookup tables are used in place of a model of the system to determine when to perform the de-energization, fuel injection, and energization. The lookup table is a function of one or more of engine speed, manifold vacuum pressure, and desired torque.

Another factor in determining the time at which the intake valve is caused to open is the amount of air desired in the cylinder. There are situations in which the intake valve is opened earlier or later than the exact optimal time for inducing intake turbulence so that the appropriate amount of air is inducted into the cylinder; the desire amount of air is determined so as to supply the desired amount of engine torque.

In one embodiment, it is desirable to open the intake valve more than once during the intake stroke. Some air is inducted during the first opening and when the intake valve is closed, further downward motion of the piston causes a vacuum to develop in the cylinder. When the intake valve is opened a second time, the pressure difference across the valve induces a greater degree of turbulence than if the valve were left open. Because of the rush of air that is induced when the valve is opened, mixing is enhanced.

In yet another embodiment, fuel is injected between the first opening and the second opening. If the rush of air is too forceful, the injected fuel may be pushed against cylinder walls. Thus, by injecting the fuel in between the two intake periods, the fuel is injected into highly turbulent air, but not pushed against the wall.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

We claim:

1. A method for operating an internal combustion engine, the engine having a plurality of engine cylinders with reciprocating pistons disposed therein, each cylinder having an electromechanically-actuated intake valve, the method comprising:

opening the electromechanical intake valve associated with a particular cylinder during an intake stroke such that the intake valve is opened near a time when a speed of the piston within said particular cylinder is at a maximum; and opening a fuel injector so that fuel sprays into said particular cylinder during peak flow rate through the intake valve, said fuel injector being disposed in said particular cylinder.

2. The method of claim 1, further comprising:

closing the electromechanically-actuated intake valve after a predetermined time has elapsed since said intake valve opening.

3. The method of claim 2, said predetermined time being based on oscillation characteristics of the intake valve.

4. The method of claim 2, wherein said predetermined time is approximately a valve period, said valve period is the time elapsed between opening said electromechanically-actuated intake valve until said electromechanically-actuated intake valve returns to a nearly closed position for a first time.

5. The method of claim 2, wherein said predetermined time is substantially an integral number of valve periods, said valve period is the time elapsed between opening said electromechanically-actuated intake valve until said electromechanically-actuated intake valve returns to a nearly closed position.

6. The method of claim 1 wherein the valve opening is accomplished by de-energizing a valve closing electromagnet wherein the engine has an electromechanical valve system with an armature operatively connected to the intake valve, said valve closing electromagnet capable of exhibiting an electromagnetic force for attracting the armature to open the intake valve, a valve opening spring for biasing the armature in a direction to open the intake valve, and a valve closing spring for biasing the armature in a direction to close the intake valve.

7. A method for operating an internal combustion engine, the engine having a plurality of engine cylinders with reciprocating pistons disposed therein, each cylinder having an electromechanically-actuated intake valve, an exhaust valve, and a fuel injector disposed in a cylinder head of the engine, the engine further having an electromechanical valve system having an armature operatively connected to the intake valve, a valve closing electromagnet capable of exhibiting an electromagnetic force for attracting the armature to open the intake valve, a valve opening spring for biasing the armature in a direction to open the intake valve, and a valve closing spring for biasing the armature in a direction to close the intake valve, the method comprising:

de-energizing the valve closing electromagnet associated with a particular cylinder during an intake stroke such that the intake valve is fully open when a speed of the piston within said particular cylinder is near a maximum;

opening the fuel injector so that fuel sprays into said particular cylinder during peak flow rate through the intake valve;

energizing the valve closing electromagnet after a predetermined time has elapsed de-energizing the valve in said particular cylinder a second time during said intake stroke;

energizing the valve in said particular cylinder a second time during said intake stroke; and opening the fuel injector so that fuel sprays into said particular cylinder in between a time of said second de-energization and said second energization.

8. The method of claim 7 wherein said second de-energization and said second energization occur during said intake stroke prior to the piston within said particular cylinder achieves maximum speed.

9. The method of claim 7 wherein said second de-energization and said second energization occur during said intake stroke after the piston within said particular cylinder achieves maximum speed.

10. The method of claim 7, further comprising:

de-energizing the valve in said particular cylinder a second time during said intake stroke;

energizing the valve in said particular cylinder a second time during said intake stroke; and opening the fuel injector so that fuel sprays into said particular cylinder in between prior to said second de-energization.

11. The method of claim 7 wherein said fuel injector opening continues beyond a time of said second opening.

12. An internal combustion engine with a plurality of cylinders, comprising:

an electromagnetically-actuated intake valve disposed in each cylinder;

a piston disposed in each cylinder;

a fuel injector coupled to each cylinder; and an electronic control unit electronically coupled to the engine, said injector, and said electromagnetically-actuated intake valve, said electronic control unit commanding said electromagnetically-actuated intake valve in a particular cylinder to open near a time of maximum piston speed of said piston in said particular cylinder, said electronic control unit commanding said fuel injector to open during said valve opening wherein said intake valve is substantially fully open near a time of a maximum speed of said piston in said particular cylinder.

13. The engine of claim 12, wherein said fuel injector is open concurrently with said maximum speed of said piston.

14. The engine of claim 12 wherein said electronic control unit commands said electromagnetically-actuated intake valve to open a second time during said intake stroke in said particular cylinder.

15. A computer readable storage medium having stored data representing instructions executable by a computer to open an intake valve disposed in a cylinder of an internal combustion engine, the intake valve is actuated by an electromechanical valve apparatus having an armature operatively connected to the intake valve, a valve closing electromagnet capable of exhibiting an electromagnetic force for attracting said armature to close the intake valve, a valve opening spring for biasing said armature in a direction to open the intake valve, and a valve closing spring for biasing the intake valve closed, comprising:

instructions to de-energize the valve closing electromagnet coupled to the intake valve in a particular cylinder undergoing an intake stroke;

instructions to energize the valve closing electromagnet in said particular cylinder wherein said de-energizing precedes said energizing and said de-energizing and energizing occur such that the intake valve is opened near the time of maximum piston speed, said piston being disposed in said particular cylinder; and instructions to open the fuel injector during a time when the intake valve is open wherein said fuel injector is coupled to said particular cylinder.

16. The computer readable storage medium of claim 15 wherein said medium comprises a computer chip.

17. The computer readable storage medium of claim 15 wherein a time of said de-energization is further based on a desired amount of air to induct into said particular cylinder.

18. The computer readable storage medium of claim 15 wherein a valve opening electromagnet coupled to the intake valve remains de-energized during the de-energization and energization of the valve closing electromagnet.

19. The computer readable storage medium of claim 15, further comprising:
  instructions to de-energize the valve closing electromagnet coupled to the intake valve in a particular cylinder for a second time during said intake stroke; and
  instructions to energize the valve closing electromagnet in said particular cylinder for a second time during said intake stroke.

\* \* \* \* \*